United States Patent
Lee et al.

(10) Patent No.: US 8,570,271 B2
(45) Date of Patent: Oct. 29, 2013

(54) ELECTRONIC PAPER DISPLAY DEVICE AND MANUFACTURING METHOD THEREOF

(75) Inventors: Sang Moon Lee, Seoul (KR); Hwan-Soo Lee, Seoul (KR); Young Woo Lee, Suwon (KR); Jeong Bok Kwak, Suwon (KR)

(73) Assignee: Samsung Electro-Mechancis Co., Ltd., Suwon, Gyunggi-do (KR)

( * ) Notice: Subject to any disclaimer, the term of this patent is extended or adjusted under 35 U.S.C. 154(b) by 981 days.

(21) Appl. No.: 12/643,823

(22) Filed: Dec. 21, 2009

(65) Prior Publication Data
US 2011/0063259 A1 Mar. 17, 2011

(30) Foreign Application Priority Data
Sep. 14, 2009 (KR) .................. 10-2009-0086606

(51) Int. Cl.
G09G 3/34 (2006.01)
(52) U.S. Cl.
USPC .......................................... 345/107
(58) Field of Classification Search
None
See application file for complete search history.

(56) References Cited

U.S. PATENT DOCUMENTS

| 5,389,945 A | 2/1995 | Sheridon | |
|---|---|---|---|
| 5,717,515 A | 2/1998 | Sheridon | |
| 6,462,859 B1 * | 10/2002 | Bastiaens et al. | 359/296 |
| 2008/0100907 A1 * | 5/2008 | Lipovetskaya et al. | 359/296 |
| 2008/0273132 A1 | 11/2008 | Hsu et al. | |

FOREIGN PATENT DOCUMENTS

| JP | 10-062824 | | 3/1998 |
|---|---|---|---|
| JP | 2010-062824 | | 3/1998 |
| JP | 2006-058475 | A | 3/2006 |
| JP | 2007-286190 | A | 11/2007 |
| JP | 2008-276153 | A | 11/2008 |
| JP | 2008-287172 | | 11/2008 |
| JP | 2009-122198 | | 6/2009 |
| KR | 2003-0038789 | | 5/2003 |
| KR | 2008-0097330 | A | 11/2008 |
| WO | WO 02-29485 | | 4/2002 |

OTHER PUBLICATIONS

English Translation of Japanese patent publication JP, 2008-287172 to Yamazaki.*
English translation of Japanese patent publication H10-062824 to Nakamura.*

* cited by examiner

Primary Examiner — Nicholas Lee
(74) Attorney, Agent, or Firm — McDermott Will & Emery LLP

(57) ABSTRACT

There is provided an electronic paper display device and a manufacturing method thereof. The electronic paper display device includes a first electrode formed of a transparent material; at least one or more second electrodes disposed to face the first electrode with differing gaps therebetween; and at least one or more display units disposed between the first and second electrodes and having optical properties varied according to voltage applied to the first and second electrodes. The display units are disposed between the first electrode and the second electrodes disposed to face the first electrode with differing gaps, so respective rotation amounts or rotation angles of the display units become different when the same magnitude of voltage is applied. Accordingly, a wide range of contrast levels is displayed.

12 Claims, 4 Drawing Sheets

ELECTRONIC PAPER DISPLAY DEVICE AND MANUFACTURING METHOD THEREOF

CROSS-REFERENCE TO RELATED APPLICATIONS

This application claims the priority of Korean Patent Application No. 10-2009-0086606 filed on Sep. 14, 2009, in the Korean Intellectual Property Office, the disclosure of which is incorporated herein by reference.

BACKGROUND OF THE INVENTION

1. Field of the Invention

The present invention relates to an electronic paper display device and a manufacturing method thereof, and more particularly, to an electronic paper display device capable of achieving excellent stability and uniformity of an image and the facilitation of contrast adjustment and a manufacturing method thereof.

2. Description of the Related Art

In recent years, changes in the way information is transferred and shared have been required to keep pace with an information society in which a new paradigm is required. In order to satisfy such a requirement, the development of electronic paper capable of being bent as a flexible display has been accelerated, and thus the technological development of electronic paper is now entering a commercially viable stage.

In comparison with an existing flat display panel, electronic paper offers lower manufacturing costs and superior energy efficiency in view of the fact that since electronic paper does not require background lighting or constant recharging, it can be driven even with very little energy. Also, electronic paper is very vivid and has a wide viewing angle. Moreover, electronic paper has a memory function allowing for the retention of characters even without power. These advantages allow for a wide range of electronic paper applications, such as an electronic book having a paper-like appearance and including moving illustrations, a renewable newspaper, a reusable paper display for a mobile phone, a disposable TV screen, or electronic wallpaper. Electronic paper therefore has huge market potential.

Proposed technical methods for the realization of electronic paper are divided into four approaches: a twist ball method allowing for the rotation of spherical particles having oppositely electrically charged upper and lower hemispheres of different colors by using an electric field; an electrophoretic method of keeping charged pigment particles mixed with oil in a microcapsule or a microcup and applying an electric field thereto or allowing charged particles to respond to the application of an electric field; a Quick Response-Liquid Powder Display (QR-LPD) method using a charged liquid powder; or a Cholesteric-Liquid Crystal Display (Ch-LCD) method using selective reflection of cholesteric liquid crystal molecules.

According to the twist ball method, a cell is filled with a transparent medium, and a twist ball having opposite electric charges and different colors, for example, a twist ball hemispherically colored black and white is disposed in the transparent medium. When voltage is applied to the twist ball, the twist ball rotates such that the hemisphere having a polarity opposite to that of the applied voltage is positioned toward the front side of a display according to direction of the applied voltage, and thus black or white can be displayed.

In this structure, however, since voltage is applied from upper and lower transparent electrodes disposed on the top and bottom of the cell, the twist ball rotates while allowing charged states to be balanced in a parallel manner according to the direction of the applied voltage. Accordingly, only two colors, i.e. black and white, are displayed, so there is a limitation in the display of contrast levels.

SUMMARY OF THE INVENTION

An aspect of the present invention provides an electronic paper display device allowing for excellent stability and uniformity of an image and the facilitation of contrast adjustment and a manufacturing method thereof.

According to an aspect of the present invention, there is provided an electronic paper display device, the electronic paper display device including: a first electrode formed of a transparent material; at least one or more second electrodes disposed to face the first electrode with differing gaps therebetween; and at least one or more display units disposed between the first and second electrodes and having optical properties varied according to voltage applied to the first and second electrodes.

The second electrodes may be formed on a lower structure including at least one or more stepped parts having different heights.

The first electrode may be formed on a first substrate formed of a light-transmitting material.

The first and second electrodes may have a plurality of partitions provided therebetween in order to accommodate the display units.

Two or more of the display units, disposed on two or more of the second electrodes facing the first electrode with differing gaps therebetween, form a single pixel.

The display units may include rotatable balls having two display areas having different colors and different electrical charge properties.

The rotatable balls may have a shape of a sphere, an oval-shaped sphere or a cylinder.

The display units may include microcapsules having transparent fluid including two types of charged particles sealed therein. The charged particles are spread in the transparent fluid and have different electrical charge properties.

The display units may include transparent fluid and two types of charged particles spread in the transparent fluid and having different electrical charge properties.

According to another aspect of the present invention, there is provided a method of manufacturing an electronic paper display device, the method including: forming a lower structure having at least one or more stepped parts having different heights; forming at least one or more first electrodes on the stepped parts; disposing display units on the first electrodes; and forming a second electrode disposed to face the first electrodes and covering the display units.

The method may further include forming partitions to accommodate the display units on the lower structure.

The lower structure may be formed by implanting, injection molding, laser patterning, or photolithography.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
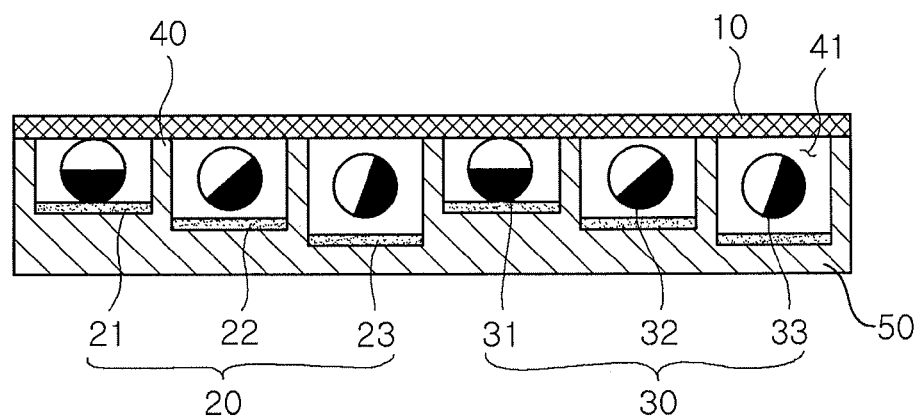
FIG. 1 is a schematic cross-sectional view illustrating an electronic paper display device according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a schematic cross-sectional view illustrating an electronic paper display device according to an exemplary embodiment of the present invention. Referring to FIG. 1, an electronic paper display device according to the present embodiment includes a first electrode 10, second electrodes 20, and display units 30.

The first electrode 10 may be provided as a display surface and may be formed of a transparent material. Also, the first electrode 10 may be formed on a first substrate (not shown) that is formed of a light-transmitting material.

The first substrate may be formed of glass or flexible plastic. For example, the plastic may be polyethylene terephthalate (PET), polycarbonate (PC), polymethylmethacrylate (PMMA), polyethylenenaphthalate (PEN), Polyethersulfone (PES), cycloolefin copolymer (COC), polydimethylsiloxane (PDMS), or poly urethane acrylate (PUA). However, the plastic is not limited thereto.

The electronic paper display device according to this embodiment includes the first electrode 10 and at least one or more second electrodes 21, 22 and 23.

Each of the second electrodes 21, 22 and 23 is disposed to face the first electrode 10 with differing gaps therebetween.

As shown in FIG. 1, the second electrodes 21, 22 and 23 may be formed on a lower structure 50 including at least one or more stepped parts having different heights.

The first and second electrodes 10 and 20 may be formed of a conductive material that has been commonly used in this technical field. For example, a conductive polymer such as polythiophene (PT) or polyaniline (PANI), metal particles such as silver or nickel, a polymer film including the metal particles, Indium-Tin-Oxide (ITO), or the like may be used therefor.

The first and second electrodes 10 and 20 have the display units 30 disposed therebetween. The display units 30 have optical properties varied according to voltage applied to the first and second electrodes 10 and 20.

Also, the first and second electrodes 10 and 20 may have partitions 40 formed therebetween in order to accommodate the display units 30. That is, the partitions 40 may be formed between the plurality of second electrodes 21, 22 and 23 to thereby form cell spaces 41 allowing the display units 30 to be accommodated between the first and second electrodes 10 and 20.

A material for the partitions 40 is not particularly limited so long as it has flexibility. A thermosetting resin or a UV-curable resin may be used therefor. For example, polyethylene terephthalate (PET), polycarbonate (PC), polymethylmethacrylate (PMMA), polyethylenenaphthalate (PEN), Polyethersulfone (PES), cycloolefin copolymer (COC), polydimethylsiloxane (PDMS), or poly urethane acrylate (PUA) may be used therefor.

Also, the first and second electrodes 10 and 20 may have dielectric liquid filled therebetween in order to facilitate the rotation of the display units 30.

Figure 2:
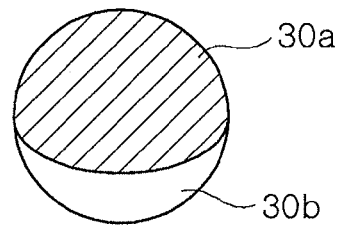
FIG. 2 is a schematic perspective view illustrating an enlarged rotatable ball according to an exemplary embodiment of the present invention.

In the present embodiment, the display units 30 may be rotatable balls. FIG. 2 is a schematic perspective view illustrating an enlarged rotatable ball. Referring to FIG. 2, the rotatable ball has two display areas 30a and 30b having different colors and different electrical charge properties. The two display areas 30a and 30b may be differently colored in such a manner that a first display area 30a may be colored white and a second display area 30b may be colored black. When the first display area 30a is charged with a positive charge, the second display area 30b is charged with a negative charge. When voltage is applied to the rotatable ball 30, the rotatable ball 30 rotates according to the magnitude and direction of the applied voltage, and black or white is displayed due to the coloring on the two display areas 30a and 30b.

In this case, a known method in the art may be used for processing the rotatable ball 30 electrically and optically to form the first and second display areas 30a and 30b. For example, there may be used a method of applying a centrifugal force to a rotatable ball provided to a rotatable disk including two coloring liquids.

The shape of the rotatable ball is not particularly limited. For example, the shape thereof may be a sphere, an oval-shaped sphere or a cylinder.

In the present embodiment, the rotatable ball 30 has two display areas formed on the surface thereof. However, the number of display areas may be three or more, if desired.

Also, the display areas may be colored a variety of colors other than black or white.

Through the first and second electrodes 10 and 20, voltage is applied to the rotatable balls 30. The rotatable balls 30 may rotate while allowing charged states to be balanced in a parallel manner according to the direction of the applied voltage, and black or white is displayed accordingly.

According to the present embodiment, the first electrode 10 and the plurality of second electrodes 21, 22 and 23, applying voltage to the rotatable balls 31, 32 and 33, are disposed to have differing gaps therebetween. Since the gaps between the first electrode and the plurality of second electrodes are different, when the same magnitude of voltage is applied to the rotatable balls, the respective rotation amounts of the rotatable balls, i.e., the respective rotation angles thereof become different.

As the gaps between the first and second electrodes become closer, the rotation amount of the rotatable balls increases, and consequently the rotation angle becomes greater. In contrast, as the gaps between the first and second electrodes become more distant, the rotation amount of the rotatable balls reduces, and consequently the rotation angle becomes smaller.

More particularly, as shown in FIG. 1, a sequence of second electrodes 21, 22 and 23, disposed to have different gaps with the first electrode 10, may be repeatedly formed. Here, the gaps between the first and second electrodes are 21>22>23.

When the same magnitude of voltage is applied, a first rotatable ball 31 disposed on the second electrode 21 having the smallest gap with the first electrode 10 has the greatest degree of rotation and a second rotatable ball 32 disposed on the second electrode 22 having an intermediate gap with the first electrode 10 has an intermediate degree of rotation, while a third rotatable ball 33 disposed on the second electrode 23 having the largest gap with the first electrode 10 has the smallest degree of rotation.

Accordingly, even though the magnitude of voltage applied to each of the rotatable balls 31, 32 and 33 is the same, a wide range of contrast levels may be displayed.

By the use of the above-described features, a single display unit may form a single pixel, or two or more display units disposed on two or more second electrodes having different gaps with the first electrode may form a single pixel.

For example, three rotatable balls disposed on three second electrodes may form a single pixel. Since the three second electrodes 21, 22 and 23 have different gaps with the first electrode 10, when the same magnitude of voltage is applied, the rotation angles of rotatable balls 31, 32 and 33 disposed on the respective second electrodes become different.

Figure 3:
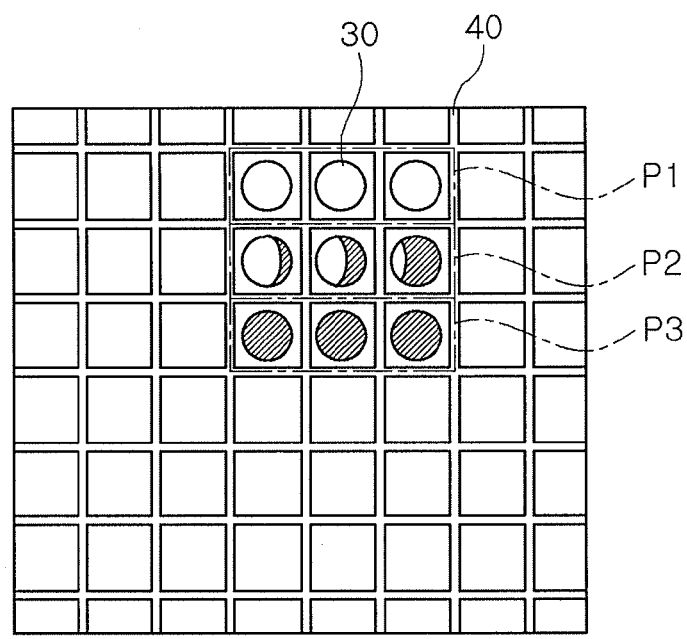
FIG. 3 is a schematic plan view illustrating an electronic paper display device according to another exemplary embodiment of the present invention.

As shown in FIG. 3, the three second electrodes 21, 22 and 23 form a single pixel P1, P2 or P3. Here, the three second electrodes 21, 22 and 23 may have different gaps with the first electrode 10.

The largest magnitude of voltage allowing three rotatable balls to rotate at 180° is applied to a first pixel P1, whereby a color having a high level of contrast, i.e., white is realized.

An intermediate magnitude of voltage is applied to a second pixel P2 to thereby allow the rotation angles of three rotatable balls to be different, whereby an intermediate level of contrast is realized.

The smallest magnitude of voltage is applied to a third pixel P3 to thereby allow the rotation angles of three rotatable balls to be smaller, whereby a color having a low level of contrast is realized.

In this manner, two or more rotatable balls, disposed on two or more second electrodes having different gaps with the first electrode, may form a single pixel, and the voltage levels applied to each pixel may be controlled to thereby realize a wide range of contrast levels.

Although not shown, in the first and second electrodes 10 and 20, a control unit may be provided in order to control the magnitude and direction of voltage applied to the rotatable balls.

Figure 4:
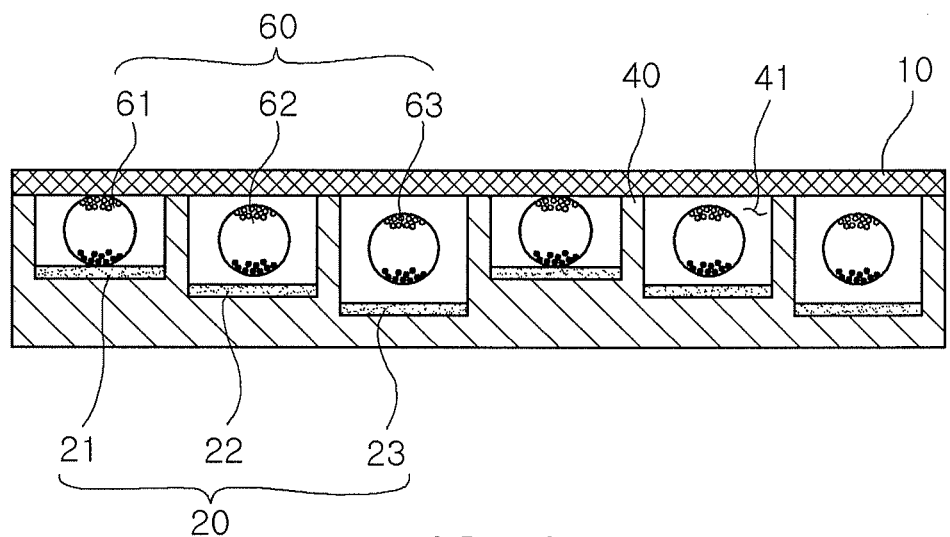
FIG. 4 is a schematic cross-sectional view illustrating an electronic paper display device according to another exemplary embodiment of the present invention.

FIG. 4 is a schematic cross-sectional view illustrating an electronic paper display device according to another exemplary embodiment of the present invention. A detailed description of elements different from those in the aforementioned embodiment will be provided below, and a detailed description of the same elements will be omitted.

In this embodiment, display units disposed between the first and second electrodes 10 and 20 may be microcapsules 60 having transparent fluid including two types of particles sealed therein, in which the two types of particles are spread in the transparent fluid and have different electrical charge properties.

Figure 5:
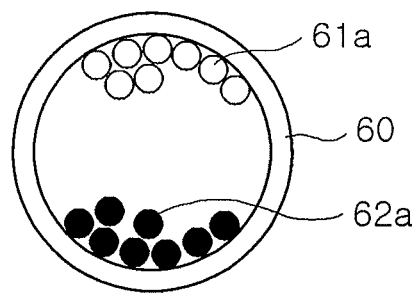
FIG. 5 is a schematic cross-sectional view illustrating an enlarged microcapsule according to another exemplary embodiment of the present invention.

FIG. 5 is a schematic cross-sectional view illustrating an enlarged microcapsule. Referring to FIG. 5, the microcapsule 60 has the transparent fluid including two types of particles 61a and 62a sealed therein by an outer wall of the microcapsule, in which the two types of particles 61a and 62a are spread in the transparent fluid, migrated by an electrophoresis phenomenon and have different electrical charge properties.

Those charged particles spread in the transparent fluid may be white particles 61a bearing a positive charge and black particles 62a bearing a negative charge.

Also, although not shown, the shape of the microcapsule is not particularly limited. For example, the shape thereof may be a sphere, an oval-shaped sphere or a cylinder.

When voltage is applied to the microcapsules 60 through the first and second electrodes 10 and 20, the charged particles migrate upward or downward, and black or white is displayed accordingly.

When the same magnitude of voltage is applied, a first microcapsule 61 disposed on the second electrode 21 having the smallest gap with the first electrode 10 includes charged particles having the greatest degree of migration and a second microcapsule 62 disposed on the second electrode 22 having the intermediate gap with the first electrode 10 includes charged particles having an intermediate degree of migration, while a third microcapsule 63 disposed on the second electrode 23 having the largest gap with the first electrode 10 includes charged particles having the smallest degree of migration. Accordingly, a wide range of contrast levels may be displayed.

Figure 6:
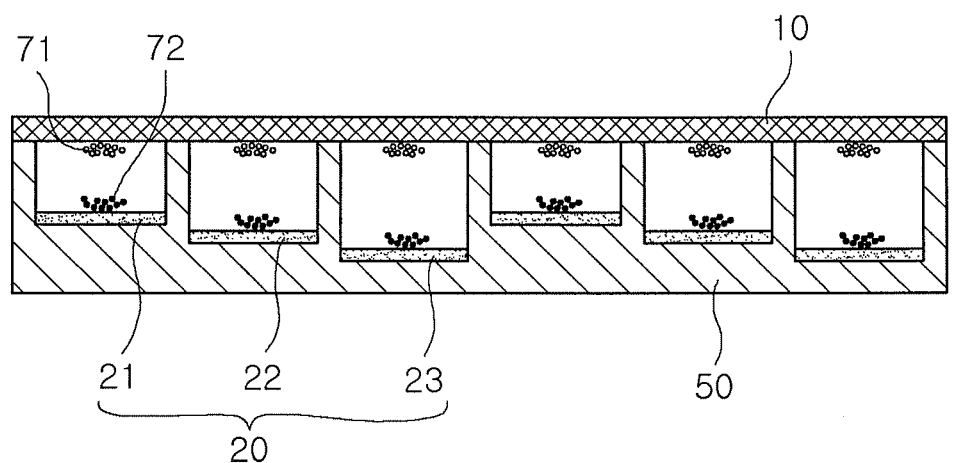
FIG. 6 is a schematic cross-sectional view illustrating an electronic paper display device according to another exemplary embodiment of the present invention.

FIG. 6 is a schematic cross-sectional view illustrating an electronic paper display device according to another exemplary embodiment of the present invention. A detailed description of elements different from those in the aforementioned embodiments will be provided below, and a detailed description of the same elements will be omitted.

In this embodiment, the first and second electrodes 10 and 20 have transparent fluid including two types of charged particles 71 and 72 filled therebetween, in which the charged particles 71 and 72 are spread in the transparent fluid and have different electrical charge properties.

The two types of charged particles 71 and 72 having different electrical charge properties may be white particles 71 bearing a positive charge and black particles 72 bearing a negative charge.

When voltage is applied to the charged particles through the first and second electrodes 10 and 20, the charged particles migrate upward or downward, and black or white is displayed accordingly.

When the same magnitude of voltage is applied, the charged particles disposed on the second electrode 21 having the smallest gap with the first electrode 10 have the greatest degree of migration and the charged particles disposed on the second electrode 22 having the intermediate gap with the first electrode 10 have an intermediate degree of migration, while the charged particles disposed on the second electrode 23 having the largest gap with the first electrode 10 have the smallest degree of migration. Accordingly, a wide range of contrast levels may be displayed.

Hereinafter, a method of manufacturing an electronic paper display device according to an exemplary embodiment of the invention will be described in detail. FIGS. 7 through 11 are cross-sectional views illustrating manufacturing processes of an electronic paper display device according to an exemplary embodiment of the invention.

Figure 7:
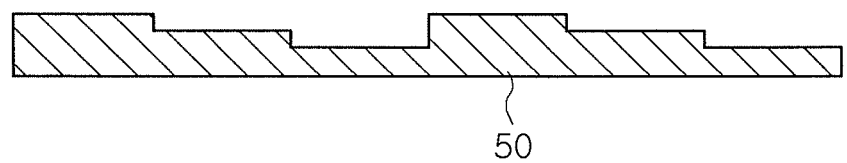
FIGS. 7 through 11 are cross-sectional views illustrating a method of manufacturing an electronic paper display device according to an exemplary embodiment of the present invention.

First of all, as shown in FIG. 7, a lower structure 50 is formed to include at least one or more stepped parts having different heights.

The lower structure 50 may be formed by implanting, injection molding, laser patterning, or photolithography. However, a method of forming the lower structure 50 is not limited thereto.

A material for the lower structure 50 is not particularly limited, and a thermosetting resin or a UV-curable resin may be used therefor. For example, polyethylene terephthalate (PET), polycarbonate (PC), polymethylmethacrylate (PMMA), polyethylenenaphthalate (PEN), Polyethersulfone (PES), cycloolefin copolymer (COC), polydimethylsiloxane (PDMS), or poly urethane acrylate (PUA) may be used therefor.

Figure 8:
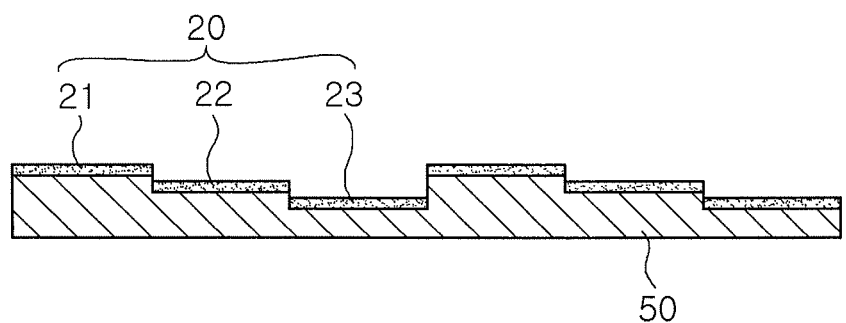

Next, as shown in FIG. 8, a plurality of first electrodes 21, 22 and 23 are formed on the respective stepped parts. Here, the first and second electrodes 10 and 20 in the electronic paper display device of FIG. 1 are respectively depicted as the second and first electrodes 10 and 20 in the electronic paper display device of FIGS. 7 through 11.

A method of forming electrodes is not particularly limited. The electrodes may be formed by a plating process or a printing method using a conductive material.

Figure 9:
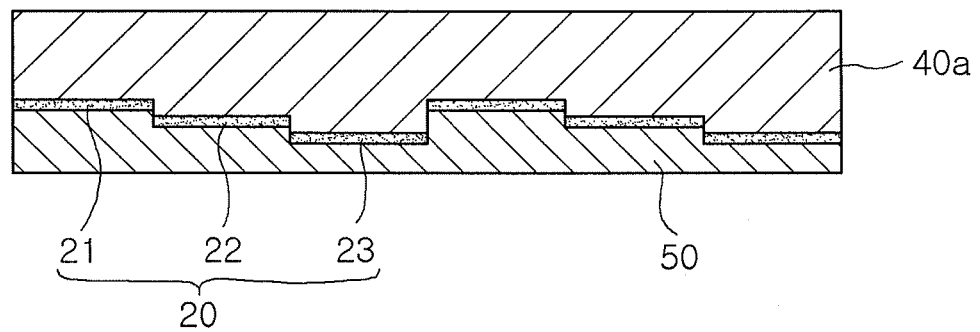
Figure 10:
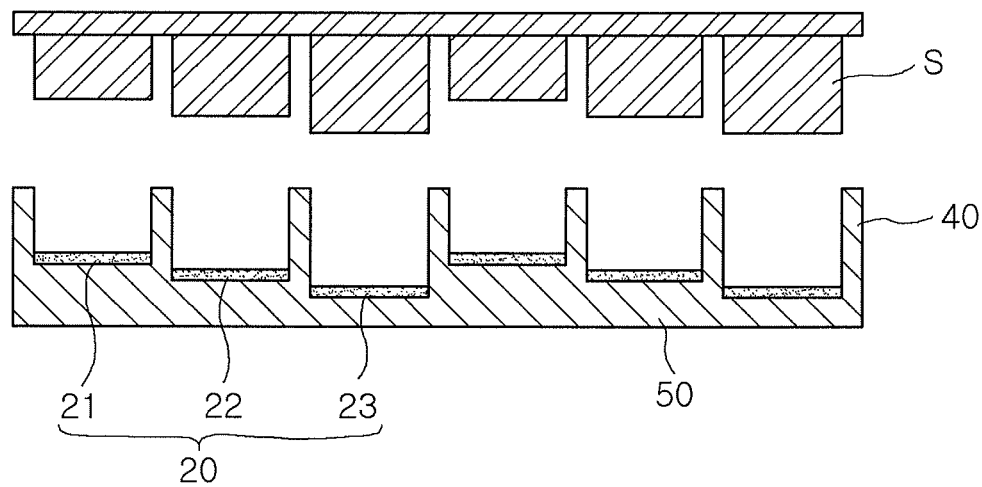

After that, as shown in FIGS. 9 and 10, the partitions 40 may be formed to allow the plurality of first electrodes 21, 22 and 23 to be divided thereby. The partitions 40 may be formed in order to accommodate display units.

As shown in FIG. 9, in order to cover the plurality of first electrodes 21, 22 and 23, a resin layer 40*a* is formed thereon. After that, as shown in FIG. 10, the resin layer 40*a* is squeezed with a stamp S having embossed and depressed patterns. The partitions 40 are formed according to the embossed and depressed patterns of the stamp S.

Here, the embossed and depressed patterns of the stamp S may be adjusted to thereby adjust the gaps between the partitions and the sizes of the partitions.

Figure 11:
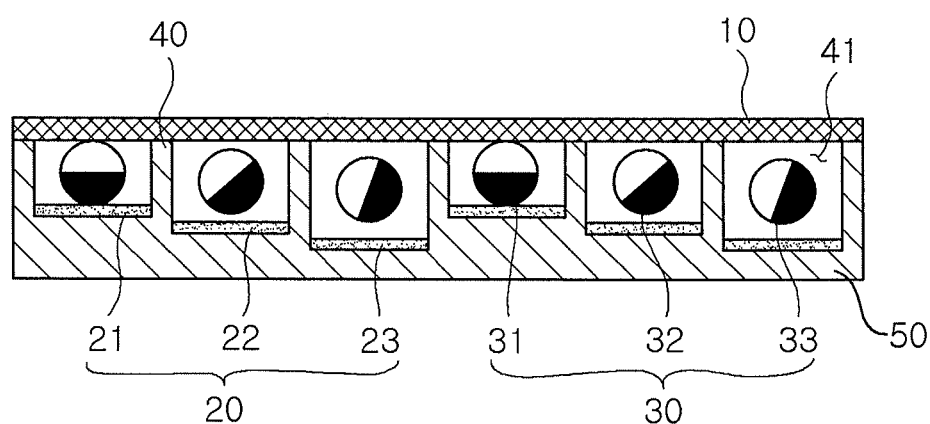

Then, as shown in FIG. 11, the display units 30 are disposed on the plurality of first electrodes 21, 22 and 23. The display units may be injected into the cell spaces 41 formed by the partitions 40 using a squeegee. Such a structure allowing the display units 30 to be disposed in the cell spaces 41 formed by the partitions 40 may lead to a low possibility of the presence of display units positioned in locations other than cell spaces, such as partitions.

Then, a second electrode 10 is formed to be disposed to face the plurality of first electrodes 21, 22 and 23 and to cover the display units 30. Here, the first and second electrodes may have dielectric liquid filled therebetween in order to facilitate the rotation of the display units 30.

Here, the second electrode 10 may be formed on a substrate formed of a light-transmitting material.

The display units may be rotatable balls, microcapsules, or charged particles.

As set forth above, according to exemplary embodiments of the invention, there is provided an electronic paper display device including a first electrode and at least one or more second electrodes, in which each of the second electrodes is disposed to face the first electrode 10 having differing gaps therebetween. Those different gaps between the first electrode and the at least one or more second electrodes applying voltage to display units cause respective rotation amounts or rotation angles of the display units to be different, even when the same magnitude of voltage is applied to the first and second electrodes, and thus a wide range of contrast levels is achieved.

Also, when two or more second electrodes disposed to have different gaps with the first electrode and two or more display units disposed between the first and second electrodes form a single pixel, a wide range of contrast levels is displayed by adjusting voltage levels applied to each pixel.

Furthermore, allowing display units to be disposed in the cell spaces formed by partitions results in a low possibility of the presence of rotatable balls positioned in locations other than cell spaces, such as partitions. Accordingly, stains or spots may not occur on a display, whereby the excellent stability and uniformity of an image are achieved.

While the present invention has been shown and described in connection with the exemplary embodiments, it will be apparent to those skilled in the art that modifications and variations can be made without departing from the spirit and scope of the invention as defined by the appended claims.

What is claimed is:

1. An electronic paper display device comprising:
   a first electrode formed of a transparent material;
   at least one or more second electrodes disposed to face the first electrode with differing gaps therebetween; and
   at least one or more display units disposed between the first and second electrodes and having optical properties varied according to voltage applied to the first and second electrodes;
   wherein, for each of the one or more second electrodes, the gap between the first electrode and the second electrode is substantially the same across the gap.

2. The electronic paper display device of claim 1, wherein the second electrodes are formed on a lower structure including at least one or more stepped parts having different heights.

3. The electronic paper display device of claim 1, wherein the first electrode is formed on a first substrate formed of a light-transmitting material.

4. The electronic paper display device of claim 1, wherein the first and second electrodes have a plurality of partitions provided therebetween in order to accommodate the display units.

5. The electronic paper display device of claim 1, wherein two or more of the display units, disposed on two or more of the second electrodes facing the first electrode with differing gaps therebetween, form a single pixel.

6. The electronic paper display device of claim 1, wherein the display units comprise rotatable balls having two display areas having different colors and different electrical charge properties.

7. The electronic paper display device of claim 6, wherein the rotatable balls have a shape of a sphere, an oval-shaped sphere or a cylinder.

8. The electronic paper display device of claim 1, wherein the display units comprise microcapsules having transparent fluid including two types of charged particles sealed therein, the charged particles being spread in the transparent fluid and having different electrical charge properties.

9. The electronic paper display device of claim 1, wherein the display units comprise transparent fluid and two types of charged particles spread in the transparent fluid and having different electrical charge properties.

10. A method of manufacturing an electronic paper display device, the method comprising:
    forming a lower structure having at least one or more stepped parts having different heights;
    forming at least one or more first electrodes on the stepped parts;
    disposing display units on the first electrodes; and
    forming a second electrode disposed to face the first electrodes and covering the display units;
    wherein, for each of the one or more first electrodes, a gap formed between the first electrode and the second electrode is substantially the same across the gap.

11. The method of claim 10, further comprising forming partitions to accommodate the display units on the lower structure.

12. The method of claim 10, wherein the lower structure is formed by implanting, injection molding, laser patterning, or photolithography.

* * * * *